(12) United States Patent
Chen et al.

(10) Patent No.: US 7,440,273 B2
(45) Date of Patent: Oct. 21, 2008

(54) COMPUTER ENCLOSURE WITH DRIVE BRACKET

(75) Inventors: Yun-Lung Chen, Taipei Hsien (TW); Yu-Ming Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 18 days.

(21) Appl. No.: 11/695,064

(22) Filed: Apr. 2, 2007

(65) Prior Publication Data

US 2008/0137281 A1    Jun. 12, 2008

(30) Foreign Application Priority Data

Dec. 6, 2006    (CN) .................... 2006 2 0016223 U

(51) Int. Cl.
    *G06F 1/16*    (2006.01)
(52) U.S. Cl. .................................................... 361/685
(58) Field of Classification Search ... 312/223.1–223.6; 248/27.1, 694, 213.2; 360/97.1, 92.1; 720/600–601, 720/700; 235/379, 381; 361/679–687, 724–727
    See application file for complete search history.

(56) References Cited

U.S. PATENT DOCUMENTS

| 6,882,527 | B2 * | 4/2005 | Wang et al. | 361/685 |
| 7,092,249 | B2 | 8/2006 | Wang | |
| 7,277,279 | B2 * | 10/2007 | Chen et al. | 361/685 |
| 7,304,840 | B2 * | 12/2007 | Chen et al. | 361/685 |

\* cited by examiner

*Primary Examiner*—Hung V Duong
(74) *Attorney, Agent, or Firm*—Frank R. Niranjan

(57) ABSTRACT

A computer enclosure includes a chassis with an opening defined therein, an elastic piece, a first drive bracket secured in the chassis, and a second drive bracket. One end of the elastic piece is secured to the chassis adjacent the opening, and the other end of the elastic piece is free and forms a protrusion thereon. The second drive bracket defines a hole therein corresponding to the protrusion. The second drive bracket extends through the opening from an outside of the chassis to pull the protrusion and elastically bend the elastic piece, and then slides on the first drive bracket until the protrusion of the elastic piece is in alignment with the hole of the first drive bracket, the elastic piece rebounds to have the protrusion inserted into the hole to secure the second drive bracket on the first drive bracket.

20 Claims, 5 Drawing Sheets

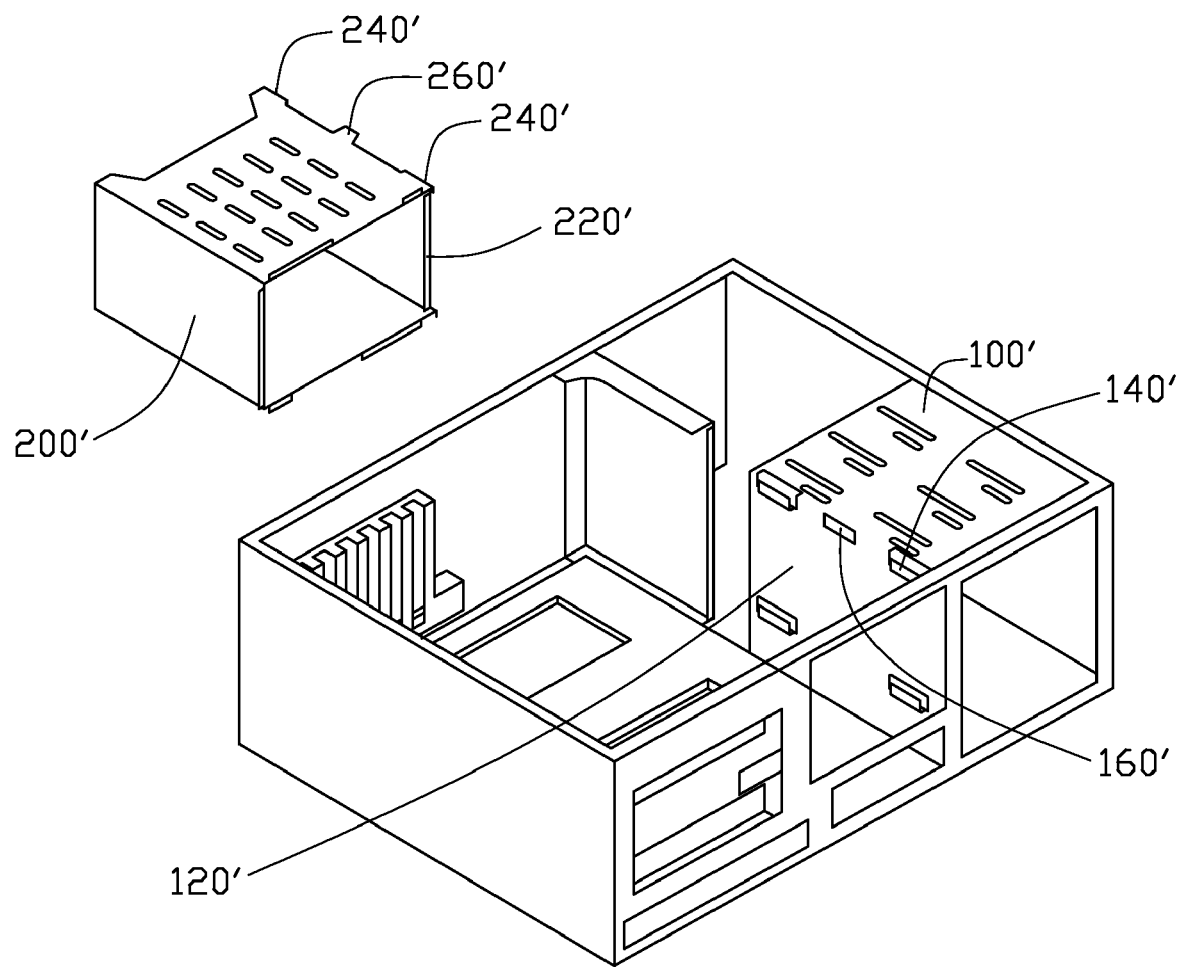
FIG. 5 <PRIOR ART>

US 7,440,273 B2

COMPUTER ENCLOSURE WITH DRIVE BRACKET

BACKGROUND OF THE INVENTION

1. Field of the Invention

The present invention relates to computer enclosures, and more particularly to a computer enclosure with drive brackets easily mounted therein.

2. Description of Related Art

When a typical personal computer is assembled, two or more drive brackets are often mounted into a computer enclosure. Then data storage devices, such as hard disk drives and floppy disk drives are attached to the drive brackets.

Users and manufacturers require the drive brackets to be installed in the computer enclosure quickly and easily. The drive brackets are typically secured to the enclosure by riveting or by using a number of screws. However, such securing means are cumbersome and time-consuming. FIG. 5 shows an improved computer enclosure with a first drive bracket 100' and a second drive bracket 200'. A pair of L-shaped tabs 140' is formed from each of upper and lower portions of one side wall 120' of the first drive bracket 100'. A positioning aperture 160' is defined in the side wall 120' between the topmost pair of tabs 140'. Two pairs of complementary L-shaped tabs 240' are formed at one side wall 220' of the second drive bracket 200', for engagement with the L-shaped tabs 140' of the first drive bracket 100'. A lip 260' is outwardly formed from the side wall 220' of the second drive bracket 200', for extension into the positioning aperture 160' of the first drive bracket 100' of the computer enclosure. However, when the second drive bracket 200' is attached to or detached from the first drive bracket 100', extra operating space within the computer enclosure itself is required.

SUMMARY OF THE INVENTION

A computer enclosure includes a chassis with an opening defined therein, an elastic piece, a first drive bracket secured in the chassis, and a second drive bracket. One end of the elastic piece is secured to the chassis adjacent the opening, and the other end of the elastic piece is free and forms a protrusion thereon. The second drive bracket defines a hole therein corresponding to the protrusion. The second drive bracket extends through the opening from an outside of the chassis to pull the protrusion and elastically bend the elastic piece, and then slides on the first drive bracket until the protrusion of the elastic piece is in alignment with the hole of the first drive bracket, the elastic piece rebounds to have the protrusion inserted into the hole to secure the second drive bracket on the first drive bracket.

Other advantages and novel features of the present invention will become more apparent from the following detailed description of preferred embodiment when taken in conjunction with the accompanying drawings, in which:

BRIEF DESCRIPTION OF THE DRAWINGS

FIG. 5 is an exploded isometric view of a conventional computer enclosure having drive brackets.

DETAILED DESCRIPTION OF THE INVENTION

Figure 1:
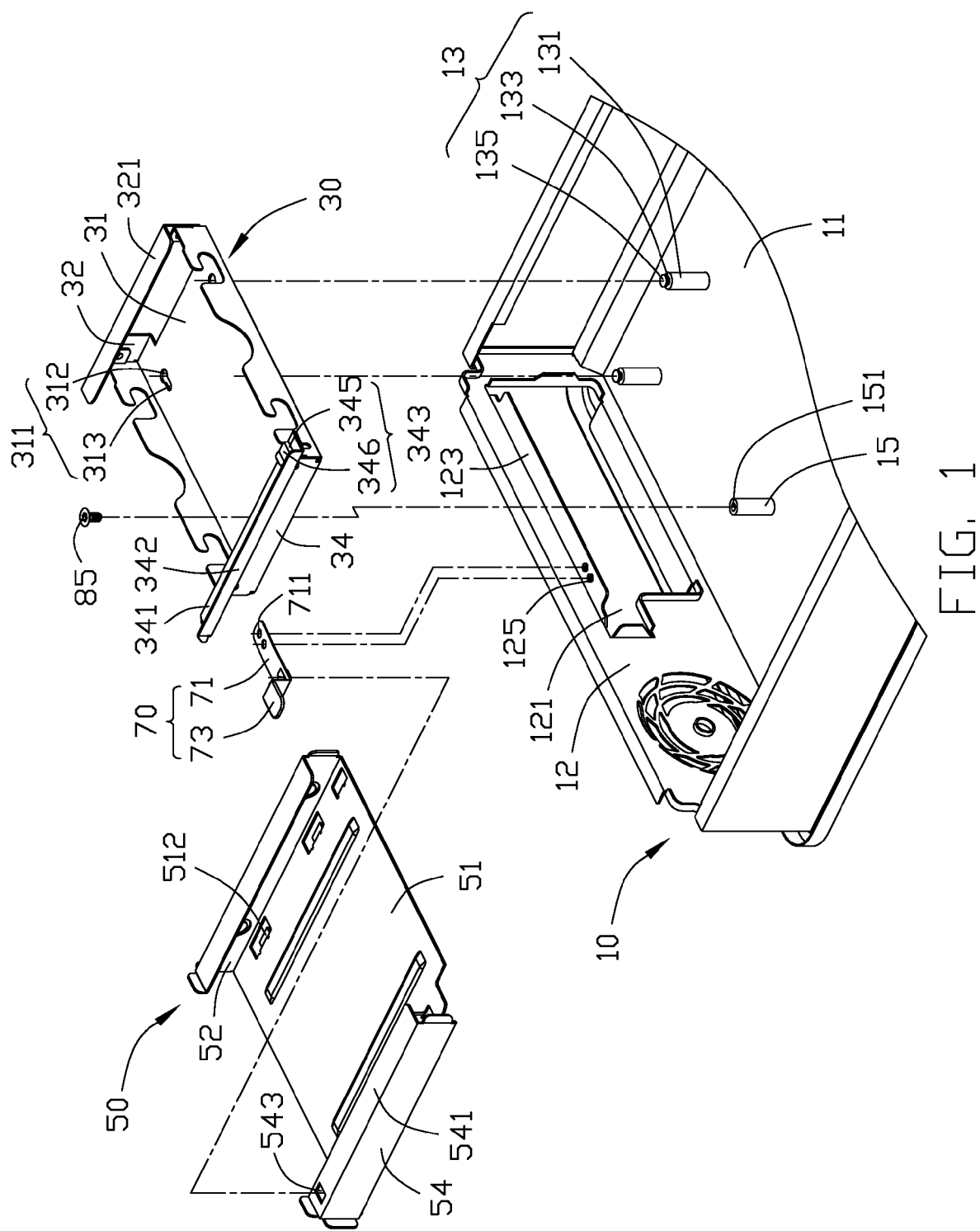
FIG. 1 is an exploded, isometric view of a preferred embodiment of a computer enclosure in accordance with the present invention, including a chassis, a first drive bracket, and a second drive bracket.

Referring to FIG. 1, a computer enclosure in accordance with a preferred embodiment of the present invention includes a chassis 10, a first drive bracket 30, and a second drive bracket 50.

The chassis 10 includes a bottom wall 11 and a side wall 12 extending perpendicularly and upwardly from a front edge of the bottom wall 11. A pair of posts 13 is formed upwardly on the bottom wall 11. Each of the posts 13 includes a shank portion 131 connected with the bottom wall 11, a neck portion 133 formed on an upper end of the shank portion 131, and a head portion 135 formed on an upper end of the neck portion 133. The neck portion 133 is formed thinner than the shank portion 131 and the head portion 135. A pole 15 is formed upwardly on the bottom wall 11. An upper end of the pole 15 defines a screw hole 151 therein. The side wall 12 defines an opening 121 therein. An edge of the side wall 12 bordering a top of the opening 121 extends horizontally into the chassis 10 to form a flange 123 thereof. A pair of screw holes 125 is defined in the flange 123.

Figure 2:
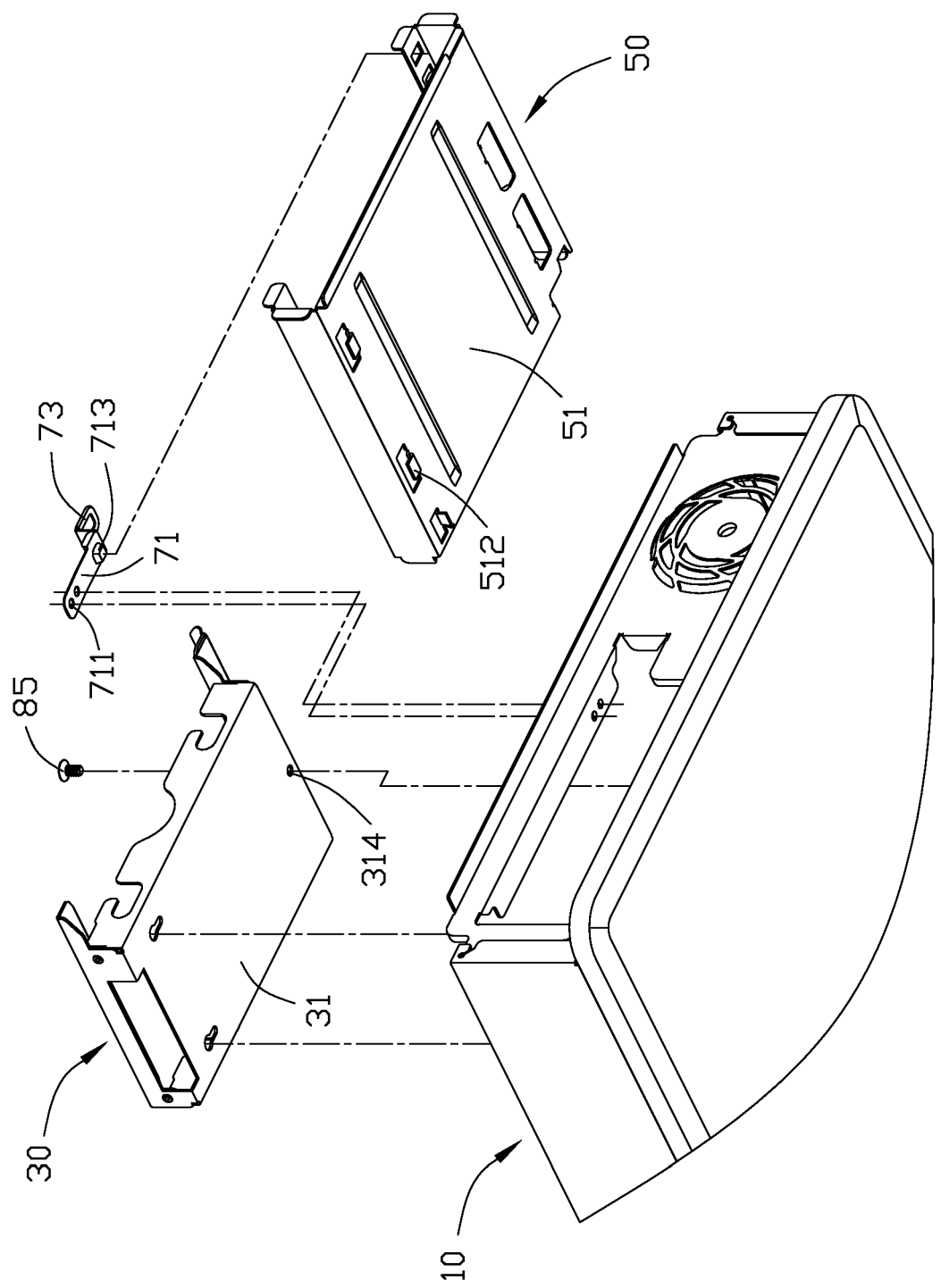
FIG. 2 is similar to FIG. 1, but viewed from another aspect.
Figure 3:
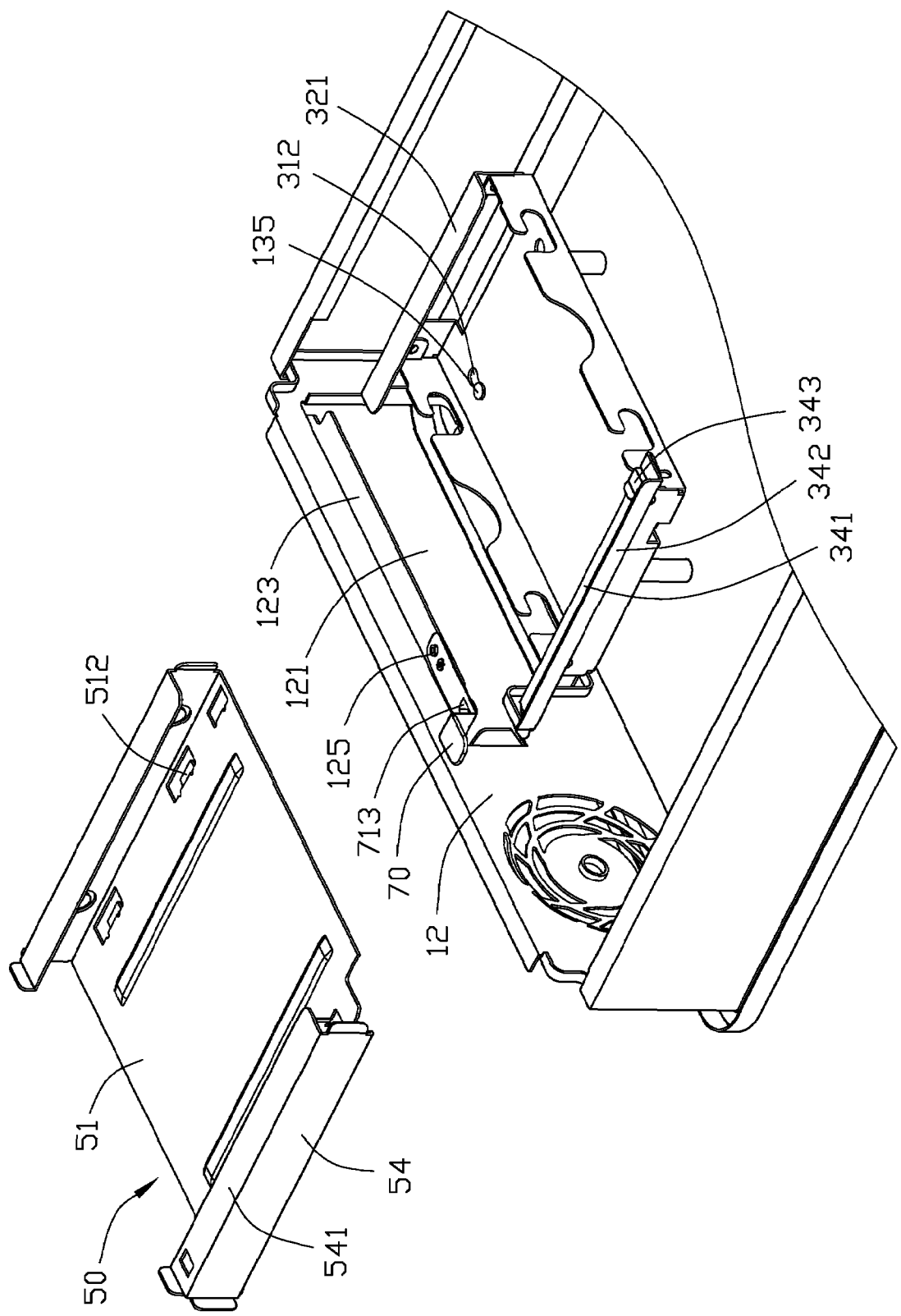
FIG. 3 is a partially-assembled view of the computer enclosure of FIG. 1.

Referring to FIGS. 2 and 3, the first drive bracket 30 includes a bottom plate 31 and two side plates 32, 34. The side plates 32, 34 are formed from a pair of opposite edges of the bottom plate 31. The bottom plate 31 defines a pair of locking holes 311 corresponding to the pair of posts 13 of the chassis 10. Each locking hole 311 includes a wide portion 312 and a narrow portion 311 communicating with the wide portion 312. A diameter of the wide portion 312 is larger than a diameter of the head portion 135 of the post 13. A diameter of the narrow portion 311 is larger than a diameter of the neck portion 133 of the post 13, and smaller than the head portion 135 and shank portion 133 of the post 13. The bottom plate 31 defines a through hole 314 therein corresponding to the screw hole 151 of the chassis 10. An upper portion of the side plate 32 is bent inward to form a horizontally bent piece 321. An upper portion of the side plate 34 is bent outward to form a horizontally bent piece 341. A side piece 342 extends perpendicularly and upward from the bent piece 341. The bent pieces 321 and 341 are located at a same horizontal level. The bent piece 341 forms a L-shaped stop piece 343 thereon. The stop piece 343 includes a stop portion 345 perpendicularity connecting to the bent piece 341 and an elastic clip 346 located generally parallel to the bent piece 341.

The second drive bracket 50 includes a bottom plate 51 and two side plates 52, 54. The side plates 52, 54 are formed from a pair of opposite edges of the bottom plate 51. An upper portion of the side plate 52 is bent inward to form a horizontal piece 541 thereon. The piece 541 defines a hole 543 therein. The bottom plate 51 is stamped downwardly to form two lip-pieces 512 extending below and parallel to the bottom plate 51.

An elastic piece 70 includes a main body 71 and an operating portion 73 formed upwardly from one end of the main body 71. The main body 71 forms a downward extending protrusion 713 adjacent the operating portion 73. The main body 71 defines a pair of securing holes 711 adjacent the other end of the main body 71 corresponding to the screw holes 125 of the chassis 10.

Figure 4:
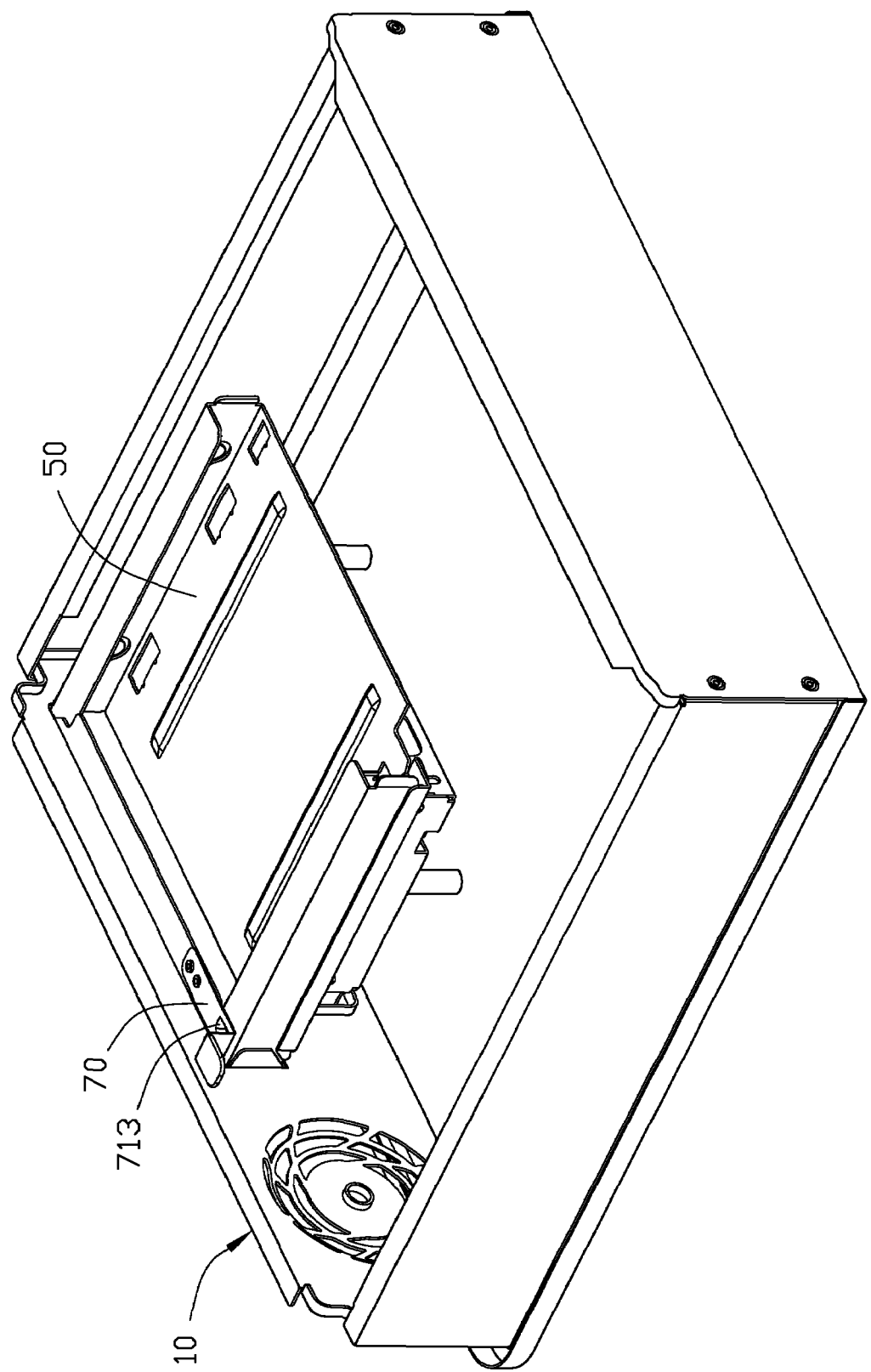
FIG. 4 is an assembled view the computer enclosure of FIG. 1.

Referring to FIGS. 1, 3, and 4, the elastic piece 70 is placed on the flange 123 of the chassis 10 with the pair of securing holes 711 in alignment with the pair of screw holes 125 of the flange 123. Two screws extend through the securing holes 711 and screw into the screw holes 125 to secure the elastic piece 70 on the flange 123. The protrusion 713 of the elastic piece 70 is then located in the opening 121 of the chassis 10.

The first drive bracket 30 is moved into the chassis 10 with each locking hole 311 of the first drive bracket 30 in alignment with the corresponding post 13 of the chassis 10. The head portion 135 of the post 13 extends through the wide portion 312 of the corresponding locking hole 311 with the neck portion 133 received in the wide portion 312. Then the first drive bracket 30 slides horizontally to have the neck portions 133 moving from the corresponding wide portions 312 into the corresponding narrow portions 313, so the bottom plate 31 of the first drive bracket 30 is sandwiched between the head portions 135 and the shank portions 133 of the posts 13. Simultaneously, the through hole 314 of the first drive bracket 30 is aligned with the screw hole 151 of the chassis 10. A screw 85 extends through the through hole 314 and screw into the screw hole 151 to secure the first drive bracket 30 in the chassis 10. At this moment, the bent pieces 321, 341 of the first drive bracket 30 are in alignment with opposite edges of the opening 12 of the chassis 10.

The second drive bracket 50 is moved from an outside of the chassis 10 into an inside of the chassis 10 through the opening 121. The piece 541 of the second drive bracket 50 resists against the protrusion 713 of the elastic piece 70, and upwardly bends the elastic piece 70. The bottom plate 51 of the second drive bracket 50 is placed on the bent pieces 321, 341 of the first drive bracket 30, and slides on the bent pieces 321, 341. The side piece 342 abuts against the side plate 54 of the second drive bracket 50 to guide a sliding movement of the second drive bracket 50. The bent piece 321 inserts between the bottom plate 51 and the lip piece 512. The second drive bracket 50 slides on the bent pieces 321, 341 until one end of the piece 541 resists against the stop portion 345 of the stop piece 343. The clip 346 sandwiches the bottom plate 51 of the second drive bracket 50 with the bent piece 341. Then, the hole 543 of the second drive bracket 50 is in alignment with the protrusion 713 of the elastic piece 70. The elastic piece 70 rebounds to insert the protrusion 713 into the hole 543 of the second drive bracket 50. The second drive bracket 50 is attached on the first drive bracket 30.

In disassembly of the second drive bracket 50 from the first drive bracket 30, the operating portion 73 of the elastic piece 70 is pulled upwardly to withdraw the protrusion 713 from the hole 543 of the second drive bracket 50. The second drive bracket 50 can then be pulled out of the chassis 10 from the opening 121.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure, comprising:
   a chassis with an opening defined therein;
   an elastic piece with one end secured to the chassis adjacent the opening, the other end of the elastic piece being free and forming a protrusion thereon;
   a first drive bracket secured in the chassis; and
   a second drive bracket defining a hole therein corresponding to the protrusion;
   wherein the second drive bracket extends through the opening from an outside of the chassis to pull the protrusion and elastically bend the elastic piece, and then slides on the first drive bracket until the protrusion of the elastic piece is in alignment with the hole of the first drive bracket, the elastic piece rebounds to have the protrusion inserted into the hole to secure the second drive bracket on the first drive bracket.

2. The computer enclosure as described in claim 1, wherein the first drive bracket includes two bent pieces on opposites sides thereof, the second drive bracket comprises a bottom plate being slidable on the bent pieces.

3. The computer enclosure as described in claim 2, wherein at least one bent piece forms a stop piece thereon, the stop piece comprises a stop portion configured for resisting against the bottom plate of the second drive bracket to limit the sliding movement of the second drive bracket, and a clip configured for sandwiching the bottom plate with the at least one bent piece.

4. The computer enclosure as described in claim 2, wherein the bottom plate is stamped to form at least one lip piece, which is located below and parallel to the bottom plate, configured for sandwiching one of the bent pieces between the bottom plate and the at least one lip piece.

5. The computer enclosure as described in claim 1, wherein the chassis forms at least one post therein, the at least one post comprises a thin neck portion and a thick head portion formed upon the neck portion, the first drive bracket comprises a bottom plate which defines a locking hole therein, the locking hole comprises a wide portion configured for having the head portion extending therethrough and the neck portion inserting therein, and a narrow portion communicating with the wide portion configured for restricting the neck portion therein when the neck portion slides from the wide portion into the narrow portion.

6. The computer enclosure as described in claim 5, wherein the chassis defines a screw hole, and the bottom plate of the first drive bracket defines a through hole in alignment with the screw hole when the neck portion of the post is restricted in the narrow portion of the locking hole, a screw extends through the through hole to screw into the screw hole.

7. The computer enclosure as described in claim 6, wherein the chassis comprises a side wall extending along a side thereof, the opening is defined in the side wall, and the first drive bracket is in alignment with the opening.

8. A computer enclosure, comprising:
   a chassis with a first drive bracket secured therein, the first drive bracket forming two bent pieces on opposites sides thereof, at least one bent piece forming a stop piece thereon, the stop piece comprising a stop portion connecting to the at least one bent piece and an elastic clip located parallel to the at least one bent piece;
   a second drive bracket slidably mounted into the chassis and comprising a bottom plate, the second drive bracket being movably secured on the first drive bracket in such a manner that the bottom plate of the second drive bracket slides on the bent pieces to resist against the stop portion of the stop piece, and the clip of the stop piece sandwiches the bottom plate with the at least one bent piece; and
   a locking member fixed with respect to the chassis and locked with the second drive bracket when the second drive bracket resists against the stop portion to block the second drive bracket withdrawing from the chassis.

9. The computer enclosure as described in claim 8, wherein the chassis comprises a side wall extending along a side thereof, the side wall defines an opening in alignment with the first drive bracket configured for the second drive bracket extending therethrough.

10. The computer enclosure as described in claim 9, wherein the locking member comprises an elastic piece with one end secured to the chassis adjacent the opening, and the other end being free and forming a protrusion thereon, the protrusion is pulled by the second drive bracket to elastically bend the elastic piece when the second drive bracket extends through the opening, the second drive bracket defines a hole engaging with the protrusion when the second drive bracket resists against the stop portion of the stop piece.

11. The computer enclosure as described in claim 8, wherein the bottom plate of the second drive bracket is stamped to form at least one lip piece, which is located below and parallel to the bottom plate, configured for sandwiching at least one of the two bent pieces between the bottom plate and the lip piece.

12. The computer enclosure as described in claim 8, wherein the chassis forms at least one post therein, the at least one post comprise a thin neck portion and a thick head portion formed upon the neck portion, the first drive bracket comprises a bottom plate which defines a locking hole therein, the locking hole comprises a wide portion configured for having the head portion extending therethrough and the neck portion inserting therein, and a narrow portion communicating with the wide portion configured for restricting the neck portion therein when the neck portion slides from the wide portion into the narrow portion.

13. The computer enclosure as described in claim 12, wherein the chassis defines a screw hole, and the bottom plate of the first drive bracket defines a through hole in alignment with the screw hole when the neck portion of the post is restricted in the narrow portion of the locking hole.

14. A computer enclosure comprising:
a chassis comprising a bottom wall and a side wall perpendicular to the bottom wall, the side wall defining an opening therethrough;
a first drive bracket secured in the chassis and configured for receiving a data storage device therein, the first drive bracket forming at opposites sides thereof two guiding members respectively adjacent to opposite sides of the opening, the guiding members being perpendicular to the side wall, one of the guiding members forming thereon a stop structure;
a second drive bracket configured for receiving another data storage device therein and slidably mounted into the chassis via the opening, the second drive bracket comprising a bottom plate being capable of sliding along the guiding members of the first drive bracket until the second drive bracket resists against the stop structure;
an elastic member comprising a fixed end fixed with respect to the chassis and a free end at which a locking structure is formed, the locking structure locked with the second drive bracket for limiting the second drive bracket in a direction perpendicularly to the side wall when the second drive bracket resist against the stop structure; and
a limiting structure formed at the first drive bracket configured for limiting the second drive bracket on the first drive bracket in another direction perpendicular to the bottom wall of the chassis.

15. The computer enclosure as described in claim 14, wherein the stop structure comprises a stop portion extending from the one of the guiding members, and the limiting structure comprises a clip extending from the stop portion in a direction toward the side wall configured for sandwiching the bottom plate of the second drive bracket with the one of the guiding members in said another direction when the second drive bracket resists against the stop portion.

16. The computer enclosure as described in claim 15, wherein the second drive bracket further comprises a side plate extending from a side edge of the bottom plate and a bent piece bent in from the side plate.

17. The computer enclosure as described in claim 16, wherein a hole is defined in the bent piece, the locking structure comprises a protrusion engaged in the hole, and the elastic member further comprises an operating portion formed at the free end and being capable of being pulled to remove the protrusion from the hole.

18. The computer enclosure as described in claim 16, wherein each of the guiding members comprises a bent piece parallel to the bottom plate, the stop portion extending from one of the bent pieces and the clip being parallel to the one of the bent pieces.

19. The computer enclosure as described in claim 18, wherein a side piece extends perpendicularly from the one of the bent pieces and abuts against an outer side of the side plate of the second drive bracket.

20. The computer enclosure as described in claim 19, wherein the bottom plate of the second drive bracket is stamped downward to form at least one L-shaped lip piece located below the bottom plate and configured for sandwiching the other one of the two bent pieces with the bottom plate.

* * * * *